(12) United States Patent
    Eisenblaetter

(10) Patent No.: US 10,682,739 B2
(45) Date of Patent: Jun. 16, 2020

(54) ELECTRICAL HAND-HELD TOOL WITH PROTECTIVE DUST COVER

(71) Applicant: GERD EISENBLAETTER GMBH, Geretsried (DE)

(72) Inventor: Gerd Eisenblaetter, Geretsried (DE)

(73) Assignee: GERD EISENBLAETTER GMBH, Geretsried (DE)

( * ) Notice: Subject to any disclaimer, the term of this patent is extended or adjusted under 35 U.S.C. 154(b) by 177 days.

(21) Appl. No.: 15/884,898

(22) Filed: Jan. 31, 2018

(65) Prior Publication Data
    US 2018/0222011 A1    Aug. 9, 2018

(30) Foreign Application Priority Data
    Feb. 3, 2017  (DE) .................. 10 2017 001 002

(51) Int. Cl.
    *B24B 55/10*    (2006.01)
    *B24B 23/02*    (2006.01)
    *B24B 41/02*    (2006.01)
    *B25F 5/00*    (2006.01)
    *B24B 41/00*    (2006.01)
    *H02K 7/14*    (2006.01)
    (Continued)

(52) U.S. Cl.
    CPC ............ *B24B 55/102* (2013.01); *B24B 23/02* (2013.01); *B24B 23/028* (2013.01); *B24B 41/007* (2013.01); *B24B 41/02* (2013.01); *B25F 5/008* (2013.01); *H02K 7/145* (2013.01); *H02K 9/04* (2013.01); *B25F 5/02* (2013.01)

(58) Field of Classification Search
    CPC ....... B24B 55/102; B24B 23/02; B24B 41/02; B25F 5/008; B25F 5/02
    See application file for complete search history.

(56) References Cited

U.S. PATENT DOCUMENTS 6,527,630 B2 * 3/2003 Mannsperger ........ B24B 23/028
                                                      30/500
9,044,849 B2   6/2015 Maute et al.
(Continued)

FOREIGN PATENT DOCUMENTS

DE    688447    2/1940
DE    944976    6/1956
(Continued)

OTHER PUBLICATIONS

Search report from related EPO Appln. No. 18000046.5, dated Jul. 19, 2018.

*Primary Examiner* — Dung Van Nguyen
(74) *Attorney, Agent, or Firm* — Grossman, Tucker, Perreault & Pfleger, PLLC

(57) ABSTRACT

The invention relates to an electric hand-held tool with a tool mount, a motor for driving a tool fastened in the tool mount, and a housing which includes a handle area, a motor area for accommodating the motor, and in which vent openings are configured for the ventilation of the motor. At least in the area of the vent openings, the housing is provided with at least one cover with a closed surface, said cover sitting flush against the housing with an edge area facing the tool mount, being arranged at a distance from the housing in an area above the vent openings, and leaving a gap between the cover and the housing in the area of its edge area facing away from the tool mount.

10 Claims, 2 Drawing Sheets

(51) Int. Cl.
*H02K 9/04* (2006.01)
*B25F 5/02* (2006.01)

(56) References Cited

U.S. PATENT DOCUMENTS

| | | | |
|---|---|---|---|
| 2008/0090504 A1* | 4/2008 | Trautner | B24B 23/00 |
| | | | 451/359 |
| 2008/0315693 A1* | 12/2008 | Uchida | B25F 5/00 |
| | | | 310/62 |
| 2010/0323593 A1 | 12/2010 | Hoeschele et al. | |
| 2015/0328573 A1 | 11/2015 | Hiller | |

FOREIGN PATENT DOCUMENTS

| | | |
|---|---|---|
| DE | 19515252 | 11/1996 |
| DE | 102009026516 | 12/2010 |
| DE | 102014106693 | 11/2015 |
| DE | 202016005872 | 1/2017 |
| EP | 1714748 | 10/2006 |
| JP | 2017-024122 | 2/2017 |

* cited by examiner

ELECTRICAL HAND-HELD TOOL WITH PROTECTIVE DUST COVER

FIELD

The invention relates to an electric hand-held tool with a tool mount and a motor arranged in a housing for driving a tool fastened in the tool mount. The invention comprises both an electric hand-held tool connected to a power source via a power cord as well as an electric hand-held tool powered by an integrated battery. Examples of electric hand-held tools are electric screwdrivers, grinding or cutting machines, hand-held grinding machines being particularly preferred in the context of this invention.

BACKGROUND

For the purposes of illustration, FIG. 6 shows a hand-held grinding machine according to the prior art, specifically an angle grinder 1. The machine comprises an elongated housing with a head region 2, in the lower region of which in the figure a tool mount 3, to which a grinding disc 4 is attached, protrudes outward. In order to protect the user, approximately half of the grinding disc 4 is covered by a protective cover 5. The user holds the angle grinder with a first handle 6 extending laterally away from the head 2 as well as with a second handle 7 formed by a tapered portion of the housing opposite the head 2. The motor for driving the tool mount 3 and the tool attached to it, i.e. the grinding disc 4, are arranged in a central, essentially cylindrical portion of the housing 8. The motor is supplied with power here by means of a power cord 9. Vent openings 10 in the motor housing 8 facilitate the supply of cooling air to the motor.

Electric hand-held tools such as the grinding machine 1 described above are often used on construction sites or at other locations contaminated with dust or themselves generate dust during operation. This dust can enter through the vent openings provided in the housing into the interior of the housing and settle there. Such dust deposits can in particular damage the motor and shorten its service life. In devices according to the prior art, the vent openings are thus sometimes covered with dust filters. While the entry of dust into the interior of the housing can be reduced significantly this way, the dust filters become clogged over a period of operation. Since cleaning or replacement of the dust filters is often difficult or simply forgotten, the motor is no longer cooled sufficiently, which can lead to overheating and motor damage.

SUMMARY

Accordingly, it is the object of the invention to specify an electric hand-held tool which avoids the disadvantages described above and thus has a longer service life.

In its broadest scope, the invention thus relates to an electric hand-held tool with a tool mount, a motor for driving a tool fastened in the tool mount, and a housing comprising a handle area, a motor area for accommodating the motor, and integrated vent openings for the ventilation of the motor. At least in the area of the vent openings, the housing comprises at least one cover with a closed surface, the cover sitting flush against the housing with its edge area oriented toward the tool mount, being arranged at a distance from the housing in an area above the vent openings, and leaving a gap free between the cover and the housing in the area of its edge area facing away from the tool mount.

As a result of the cover in accordance with the invention in the area of the vent openings of the housing, air enters the vent openings, when viewed from the tool mount, further to the rear than in prior art arrangements so that the distance from a substantial dust source, i.e. the tool itself, is increased without the vent openings having to be relocated, which in most cases would not be viable without practical disadvantages. Since the cover sits flush against the housing on the side that is closer to the tool mount, and the cover is configured as an overall closed surface and covers the vent openings, dust generated during the operation of the electric hand-held tool cannot enter the vent openings directly but is instead directed over and past the vent openings by the cover. "Closed surface" here refers to the cover in the mounted state and does not preclude that the cover surface of the cover comprises, e.g., assembly apertures or the like, which, however, will not remain open once the cover has been mounted. It is expedient here to select the width of the cover so that it exceeds the length of the vent openings and so that the cover thus extends beyond the end of the vent openings lying furthest away from the tool mount. The opening for the entry of air into the vent openings thus lies beyond the end of the vent openings lying furthest away from the tool mount and against the direction of movement of the dust moving along the cover. Moreover, as the dust is slowed down at the cover and/or settles on the same, in practice hardly any dust ends up entering the interior of the housing through the vent openings. A further improvement in the deflection of the dust away from the vent openings can be achieved by configuring the area of the cover furthest away from the tool mount to turn outward away from the housing or by configuring a projection on the exterior of the cover that deflects the dust flow outward and away from the housing.

The vent openings in housings of electric hand-held tools are often arranged in several groups, e.g. on opposite sides of the housing. One advantage of the present invention lies in the fact that the position and configuration of the vent openings can basically remain as they were in the prior art, and overall that the machines can generally remain as they were with the exception of the cover and related fastening means. According to one variant, it is possible to provide a separate cover for each group of vent openings. The cover in this case is expediently configured so that not only its edge area facing the tool mount but also its lateral edge areas extending rearward away from the tool mount sit flush against the housing, thereby preventing dust from entering the area between the cover and the housing. The cover thus arches over the area of the housing provided with the vent openings and only leaves an air inlet to the vent openings in the area of the gap located on the side of the cover lying furthest away from the tool mount.

In a second and preferred variant, all vent openings for the air cooling of the motor are protected against the entry of dust with a single cover in the form of a collar. The collar completely surrounds the circumference of the housing and, as already described above with regard to the individual covers, sits flush against the housing with its edge area facing the tool mount. The remaining area of the collar preferably is positioned at a distance from the housing so that a continuous gap between the collar and the housing is formed across nearly the entire width of the collar.

The collar can basically be slid onto the housing and over the vent openings as a closed ring. However, a collar that contains a continuous slit in the transverse direction (=width direction) and that can thus be widened for placement on the housing and for allowing the power cord to be pulled through is easier to handle and thus preferable. To fasten it, the collar is then pushed together again, wherein the edge areas of the collar separated by the slit either sit flush against one another or are arranged in an overlapping manner. The collar can be configured as a strap with a uniform width or alternatively with a width that varies in the circumferential direction. For example, it is possible to reduce the width of the collar in those areas in which there are no vent openings to be covered.

The attachment of the cover is rendered easier by providing at least one stop for the cover on the housing. Preferably, the stop is for the edge area of the cover facing the tool mount which, as mentioned, sits flush against the housing. If the cover is configured as a collar, the stop is preferably shaped as a step surrounding the housing in the circumferential direction.

According to a further embodiment of the invention, at least one pair of latch devices is provided for the at least temporary attachment of the cover to the housing. These latch devices are configured in a conventional manner as a latch projection and a latch recess arranged on the housing and the cover, respectively. The latch devices are preferably configured so that the cover is detachable from the housing. However, it is also possible that the latch devices engage with one another in an unreleasable manner. Preferably, several pairs of latch devices are used for fastening the cover to the housing. Moreover, the cover can be fastened to the housing with further fastening means such as a threaded connection, securing pins, securing hooks or slides, etc.

In principle, the attachment of a cover over the vent slots is already sufficient in order to significantly reduce the penetration of dust into the interior of the housing. In particular, this applies when the size of the gap between the cover and the housing is configured to allow the passage of just the amount of air that is sufficient for the cooling of the motor. A further improvement is achieved when the gap between the cover and the housing is provided with a dust filter. This dust filter is expediently already integrated in the cover before the latter is fastened to the housing. The dust filter can, for example, be configured as a closely meshed sieve integrally molded on the cover during the manufacture of the latter. Alternatively, it is possible to provide the cover with fixtures for the dust filter and to affix the latter after the manufacture of the cover. Generally, any conventional dust filter permitting sufficient air passage is suitable for this purpose. For example, filter fleeces are particularly suitable.

The use of the described cover is not limited to particular types of electric hand-held tools. The use of the cover can be advantageous in particular with electric hand-held tools that generate dust during operation. Hand-held grinding tools are thus a preferred electric hand-held tool in the context of the present invention. The invention can thus be used in particular with an abrasive disc grinder, an angle grinder, a traverse grinder or a belt grinder, a polishing machine, a burnishing machine, a beveling machine or a deburring machine.

BRIEF DESCRIPTION OF THE DRAWINGS

With the help of the drawings, the invention will be explained in greater detail below using an angle grinder as an example. The drawings are merely schematic. Similar parts are designated with the same reference numbers. Specifically, the figures show.

DETAILED DESCRIPTION

Figure 1:
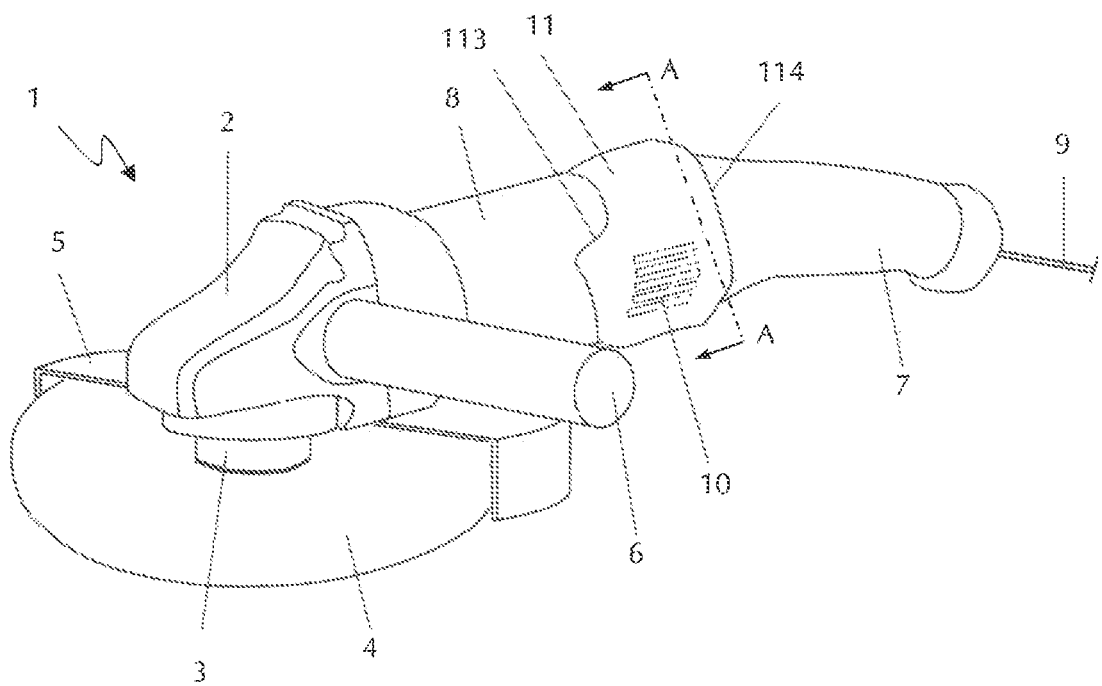
FIG. 1 is a perspective view of an angle grinder as an example of an electric hand-held tool in accordance with the invention.
Figure 6:
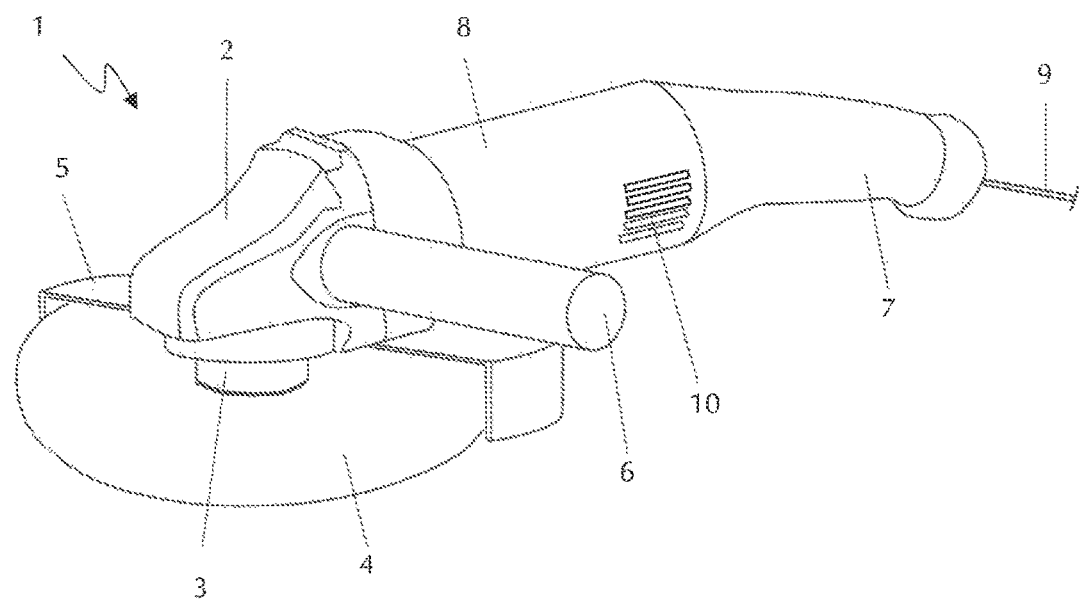
FIG. 6 is a perspective view of an angle grinder according to the prior art.

As an example of an electric hand-held tool according to the invention, FIG. 1 shows an angle grinder. The basic structure of this angle grinder corresponds to that of the angle grinder according to the prior art shown in FIG. 6. Consequently, merely the differences between the two machines will be described below.

The angle grinder 1 according to the invention differs from the machine according to the prior art in that a cover 11 is arranged in the motor area 8 of the housing (hereinafter referred to as motor housing) above the vent openings 10. The vent openings 10 here consist of two sets of parallel vent slots arranged on opposite sides of the motor housing 8. The position of the set of vent slots facing the viewer, which are covered here by the cover, is indicated by the dotted lines. In the example shown, the cover 11 consists of a collar closed in an annular manner, which has been slid over the handle area 7 of the housing and onto the motor housing 8 until it completely covers the vent slots 10. With its edge area 113 facing the tool mount 3, the cover 11 sits flush against the motor housing 8 over its entire circumference. This way, it is avoided that dust from the tool mount side can get under the cover 11.

The width of the collar, i.e. the distance between the edge area 113 and the opposite edge area 114, is greater in the region of the vent slots 10 than it is in the remaining areas in order to guarantee a reliable covering of the vent slots without unnecessarily adversely affecting the handling of the angle grinder. The rear edge area 114 protrudes beyond the end of the vent slots by a certain distance.

Figure 2:
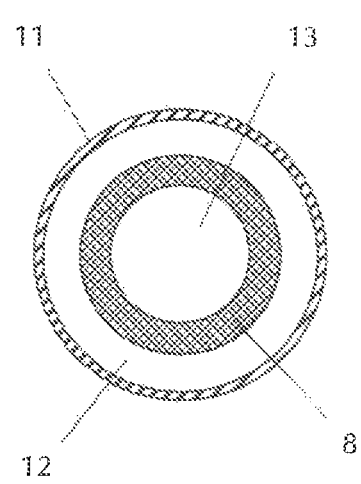
FIG. 2 is a cross section along the line A-A shown in FIG. 1.

While the front edge area 113 of the cover 11, as mentioned, sits flush against the housing 8, the remaining portion of the cover 11 is at a distance from the housing and widens slightly outward like a funnel from the edge region 113 towards the edge region 114. This way, a gap 12 is formed between the housing 8 and the cover 11, through which air can reach the vent slots 10 and enter the housing 8 and thus cool the motor (not visible here). The cross-sectional view of FIG. 2 shows this gap. For reasons of clarity, the motor arranged in the interior 13 of the housing is omitted in this illustration.

Figure 3:
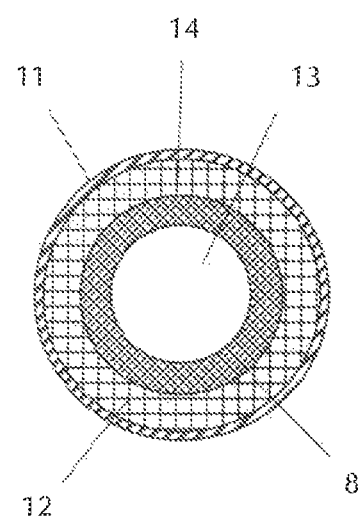
FIG. 3 is an alternative embodiment in a view corresponding to the one shown in FIG. 2.

The collar 11 slid onto the housing 8 with its closed surface thus ensures that dust generated during operation of the angle grinder is directed past the vent slots 10 and prevented from entering the vent openings without adversely affecting the ventilation of the motor. This measure is normally sufficient on its own, and at most only very small amounts of dust are sucked into the motor housing through the gap 12 with the cooling air. This can be avoided even more effectively if a dust filter 14 is arranged in the gap 12. This further embodiment is shown in FIG. 3. The dust filter 14 can be, e.g., a closely meshed grid, which is expediently already molded onto the cover during the manufacture of the latter. Additionally or alternatively, a separately formed dust filter can be used, e.g., in the form of a filter fleece, which is attached to the cover.

Figure 4:
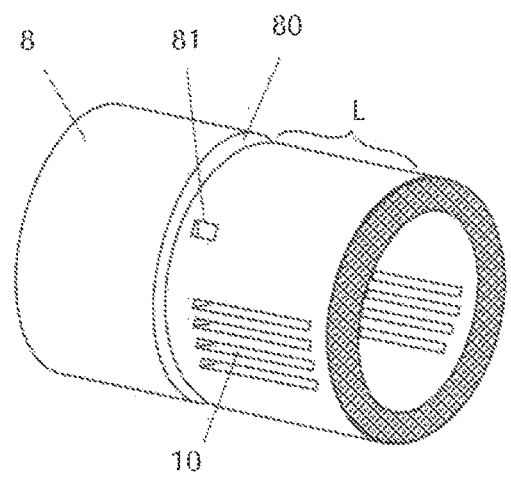
FIG. 4 is a perspective partial view of a cross section of the housing of the angle grinder shown in FIG. 1 in the area of the vent openings.
Figure 5:
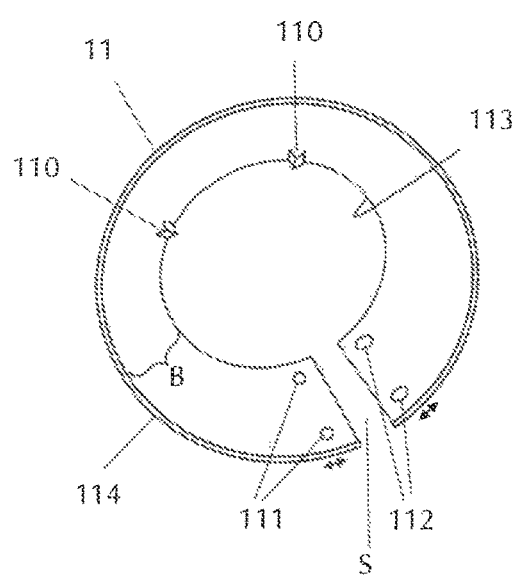
FIG. 5 is a cover in the form of a slit collar for placement on the housing shown in FIG. 4.

The attachment of the cover 11 in the desired position on the housing 8 can be facilitated by providing at least one stop and/or latch devices. This shall be explained in more detail using the example shown in FIGS. 4 and 5. FIG. 4 shows a cross-sectional perspective view of a part of the motor housing 8. The more or less annular cross-sectional area lies in the region of the line A-A shown in FIG. 1. As already described, the vent openings 10 consist of two sets of four vent slots arranged on opposite sides of the housing. At a distance from the vent openings 10 toward the tool mount side, a step 80 is provided in the housing as a stop for the cover. The corresponding cover 11 is shown in FIG. 5. The cover is again configured as a collar, which, however, in this case includes a continuous slit S extending in the transverse direction, which allows the collar to be spread and pushed together in the direction of the double arrows. This facilitates the installation of the collar, which no longer needs to be slid over the handle area 7 and the cord 9, but rather can be placed directly on the motor housing 8.

The collar 11 is thus placed on the motor housing 8 so that the edge area 113 sits flush against the stop 80. The correct positioning in the circumferential direction is effected by two pairs of latch devices, each consisting of a latch projection 110 arranged quite close to the edge area 113 of the collar and a corresponding latch recess 81 in the housing 8. Only one of these latch recesses is visible in FIG. 4. Once the collar 11 is positioned correctly on the housing 8, the latch projections 110 snap into the corresponding recesses 81 and secure the collar in the correct position on the housing. The collar 11 is then pushed together, so that its edge areas overlap and the fastening openings 111 and 112 are superimposed. The actual fastening of the collar to the housing then occurs by screwing two screws through the fastening openings 111, 112 into threaded holes in the housing (not visible in FIG. 4). The collar 11 fastened in this manner forms a funnel that widens slightly in the direction away from the tool mount, since the edge area 114 has a slightly greater length than the edge area 113. The width B of the collar 11 is slightly greater than the length L of the housing 8 between the stop 80 and the end of the vent slots 10 lying furthest away from the stop so that the collar 11 extends beyond this end of the vent slots and thus provides sufficient protection against the entry of dust. The collar 11 can also be removed from the housing by removing the screws and disengaging the latch connections.

What is claimed is:

1. An electric hand-held tool, comprising:
   a tool mount,
   a motor for driving a tool fastened in the tool mount, and
   a housing which comprises a handle area, a motor area for accommodating the motor and in which vent openings are configured for ventilation of the motor,
   wherein the housing is provided at least in an area of the vent openings with at least one cover with a closed surface, said cover sitting flush against the housing with an edge area facing the tool mount, being arranged at a distance from the housing in an area above the vent openings, and leaving a gap between the cover and the housing in the area of its edge area facing away from the tool mount.

2. The electric hand-held tool according to claim 1, wherein the cover is configured as a collar which completely surrounds the circumference of the housing in the area of the vent openings.

3. The electric hand-held tool according to claim 2, wherein the collar contains a continuous slit in a transverse direction.

4. The electric hand-held tool according to claim 1, wherein the housing includes at least one stop for the edge area of the cover facing the tool mount.

5. The electric hand-held tool according to claim 4, wherein the stop is in a shape of a step extending around the housing in a circumferential direction.

6. The electric hand-held tool according to claim 1, wherein at least one pair of complementary latch connections is configured on the housing and cover.

7. The electric hand-held tool according to claim 1, wherein the cover is fastened to the housing in a detachable manner.

8. The electric hand-held tool according to claim 1, wherein the gap between the cover and the housing is provided with a dust filter.

9. The electric hand-held tool according to claim 8, wherein the dust filter comprises a filter fleece.

10. The electric hand-held tool according to claim 1, wherein the tool is a portable grinding tool.

* * * * *